United States Patent
Gao

(10) Patent No.: US 9,467,363 B2
(45) Date of Patent: Oct. 11, 2016

(54) NETWORK SYSTEM AND METHOD OF MANAGING TOPOLOGY

(71) Applicant: NEC CORPORATION, Tokyo (JP)

(72) Inventor: Fei Gao, Tokyo (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 14/371,717

(22) PCT Filed: Jan. 29, 2013

(86) PCT No.: PCT/JP2013/051889
§ 371 (c)(1),
(2) Date: Jul. 10, 2014

(87) PCT Pub. No.: WO2013/115177
PCT Pub. Date: Aug. 8, 2013

(65) Prior Publication Data
US 2015/0003259 A1 Jan. 1, 2015

(30) Foreign Application Priority Data

Jan. 30, 2012 (JP) ................................ 2012-016225

(51) Int. Cl.
*H04L 12/26* (2006.01)
*H04L 12/705* (2013.01)
*H04L 1/22* (2006.01)

(52) U.S. Cl.
CPC .......... *H04L 43/50* (2013.01); *H04L 43/0811* (2013.01); *H04L 43/10* (2013.01); *H04L 45/18* (2013.01); *H04L 1/22* (2013.01); *Y02B 60/43* (2013.01)

(58) Field of Classification Search
CPC ......................... H04L 43/0811; H04L 43/50
See application file for complete search history.

(56) References Cited

U.S. PATENT DOCUMENTS

2007/0076606 A1  4/2007  Olesinski et al.
2008/0002677 A1  1/2008  Bugenhagen et al.
(Continued)

FOREIGN PATENT DOCUMENTS

CN   101009595 A    8/2007
JP   2003-143169 A  5/2003
(Continued)

OTHER PUBLICATIONS

International Search Report in PCT/JP2013/051889 dated Mar. 19, 2013 (English Translation Thereof).
(Continued)

*Primary Examiner* — Dang Ton
*Assistant Examiner* — Kevin Lee
(74) *Attorney, Agent, or Firm* — McGinn IP Law Group, PLLC

(57) ABSTRACT

In an open flow network, a load of a switch on a secure channel network when a controller maintains and updates a physical topology of the switch in the situation that a network among the switches is in a high delay state. More specifically, the controller sets a flow entry having a rule and an action defined to uniformly control a packet as a flow to each of a plurality of switches. The controller sets to each switch, a circulation flow entry to be deleted when a circulation packet which is mutually transmitted and received among the switches gets not to arrive. Then, when receiving a notice that the circulation flow entry has been deleted, from each switch, the controller detects a failure among the switches.

8 Claims, 8 Drawing Sheets

(56) References Cited

U.S. PATENT DOCUMENTS

2011/0255408 A1 10/2011 Aybay et al.
2011/0261825 A1 10/2011 Ichino
2011/0286324 A1 11/2011 Bellagamba et al.
2012/0026891 A1 2/2012 Kamiya

FOREIGN PATENT DOCUMENTS

| JP | 2006-340361 A | 12/2006 |
|---|---|---|
| JP | 2008-172449 A | 7/2008 |
| JP | 2009-111976 A | 5/2009 |
| WO | WO 2010/143607 A1 | 12/2010 |

OTHER PUBLICATIONS

Hisatoshi Oikawa et al., "Open Flow Network ni Okeru Keiro Joho no Tsuchi Shuho ni Kansuru Teian", Dai 73 Kai (Heisei 23 Nen) Zenkoku Taikai Koen Ronbunshu (3), Information Processing Society of Japan, Mar. 2, 2011, pp. 3-319 to 3-320.
OpenFlow Switch SpecificationVersion 1.1.0 Implemented,[online],Feb. 28, 2011 (URL:http://www.openflowswitch.org/documents/openflow-spec-v1.1.0.pdf).
English Translation of International Preliminary Report on Patentability in PCT No. PCT/JP2013/051889 dated Aug. 5, 2014.
Extended European Search Report dated Jul. 29, 2015 of corresponding EP Application No. 13/743,795.
"SPARC ICT-258457 Deliverable D3.3 Split Architecture for Large Scale Wide Area Networks", Dec. 1, 2011, XP055139597, URL: http://www.fp7-sparc.eu/assets/deliverables.SPARC_D3.3_Split_Architecture_for_Large_Scale_Wide_Area_Networks.pdf.
Sharma, et al., "Enabling Fast Failure Recovery in OpenFlow Networks", DRCN, 2011 8th International Workshop on the, IEEE, Oct. 10, 2011, p. 164-171, XP032075214.
Chinese Office Action dated Apr. 6, 2016 with an English translation thereof.

Fig. 3

TOPOLOGY KEEPALIVE PACKET
(Topology Keepalive Packet)

| MAC HEADER (Ether Header) | | |
|---|---|---|
| MAC SOURCE (Ether src.) | MAC DESTINATION (Ether dst) | FRAME TYPE (Ether Type) |
| * | Not BC/MC | 0x0111 |

Fig. 4

PACKET-OUT MESSAGE

| HEADER FIELD (Header Field) | ACTION FIELD (Action Field) | DATA FIELD | | |
|---|---|---|---|---|
| | | | MAC HEADER (Ether Header) | |
| Type is Packet out | Send data field to the Specified port | MAC SOURCE (Ether src) | MAC DESTINATION (Ether dst) | FRAME TYPE (Ether Type) |
| | | * | Not BC/MC | 0x0111 |

TOPOLOGY KEEPALIVE PACKET (Topology Keepalive Packet)

Fig. 5

TOPOLOGY KEEPALIVE FLOW ENTRY

| MATCH FIELD | COOKIE FIELD | ACTION FIELD (Header Fild) |
|---|---|---|
| ※ENTRY ITEM | COOKIE | ※PROPERTY ITEM |
| ※MATCH VALUE (Match Value) | Specified uinit64_t | ※CHARACTERISTIC VALUE |

| ※ENTRY ITEM | ※MATCH VALUE (Match Value) |
|---|---|
| INPUT PORT (Ingress Port) | Specified Port |
| META DATA (Meta data) | ANY |
| MAC SOURCE (Ether src) | ANY |
| MAC DESTINATION (Ether dst) | ANY |
| FRAME TYPE (Ether type) | 0x1111 |
| VIRTUAL LAN IDENTIFIER (VLAN id) | ANY |
| VIRTUAL LAN PRIORITY (VLAN priority) | ANY |
| MPLS LABEL (MPLS label) | ANY |
| MPLS TRAFFIC CLASS (MPLS traffic class) | ANY |
| IP SOURCE (IP src) | ANY |
| IP DESTINATION (IP dst) | ANY |
| IP PROTOCOL (IP protocol) | ANY |
| IP SERVICE TYPE (IP ToS bits) | ANY |
| SOURCE PORT (TCP/UDP src Port) | ANY |
| DESTINATION PORT (TCP/UDP dst Port) | ANY |

| ※PROPERTY ITEM | ※CHARACTERISTIC VALUE |
|---|---|
| PRIORITY (Entry Priority) | 0xffff |
| IDLE TIME (Idle time) | 0x0003 |
| FIXATION TIME (Hard time) | 0x0000 |
| FLAG (Flag) | Send Flow Removed Flag=on |
| ACTION (Action) | Send to in-port |

Fig. 6

FLOW ENTRY MODIFICATION MESSAGE (Modify Flow Entry Message)

| HEADER FIELD (Header Fild) | MATCH FIELD | COOKIE FIELD | ACTION FIELD (Header Fild) |
|---|---|---|---|
| Type is Modify State | ※ENTRY ITEM | COOKIE | ※PROPERTY ITEM |
| | ※MATCH VALUE (Match Value) | Specified uint64_t | ※CHARACTERISTIC VALUE |

| ※ENTRY ITEM | ※MATCH VALUE (Match Value) |
|---|---|
| INPUT PORT (Ingress Port) | Specified Port |
| META DATA (Meta data) | ANY |
| MAC SOURCE (Ether src) | ANY |
| MAC DESTINATION (Ether dst) | ANY |
| FRAME TYPE (Ether type) | 0x1111 |
| VIRTUAL LAN IDENTIFIER (VLAN id) | ANY |
| VIRTUAL LAN PRIORITY (VLAN priority) | ANY |
| MPLS LABEL (MPLS label) | ANY |
| MPLS TRAFFIC CLASS (MPLS traffic class) | ANY |
| IP SOURCE (IP src) | ANY |
| IP DESTINATION (IP dst) | ANY |
| IP PROTOCOL (IP protocol) | ANY |
| IP SERVICE TYPE (IP ToS bits) | ANY |
| SOURCE PORT (TCP/UDP src Port) | ANY |
| DESTINATION PORT (TCP/UDP dst Port) | ANY |

| ※PROPERTY ITEM | ※CHARACTERISTIC VALUE |
|---|---|
| COMMAND (Command) | Add/Modify Flow entry |
| PRIORITY (Entry Priority) | 0xffff |
| IDLE TIME (Idle time) | 0x0003 |
| FIXATION TIME (Hard time) | 0x0000 |
| FLAG (Flag) | Send Flow Removed Flag=on |
| ACTION (Action) | Send to in-port |

Fig. 7

FLOW ENTRY DELETION MESSAGE (Flow Entry Removed Message)

| HEADER FIELD (Header Fild) | MATCH FIELD | COOKIE FIELD | ACTION FIELD (Header Fild) |
|---|---|---|---|
| Type is Flow Removed | ※ENTRY ITEM | COOKIE | ※PROPERTY ITEM |
| | ※MATCH VALUE (Match Value) | Specified uinit64_t | ※CHARACTERISTIC VALUE |

| ※ENTRY ITEM | ※MATCH VALUE (Match Value) |
|---|---|
| INPUT PORT (Ingress Port) | Specified Port |
| META DATA (Meta data) | ANY |
| MAC SOURCE (Ether src) | ANY |
| MAC DESTINATION (Ether dst) | ANY |
| FRAME TYPE (Ether type) | 0x1111 |
| VIRTUAL LAN IDENTIFIER (VLAN id) | ANY |
| VIRTUAL LAN PRIORITY (VLAN priority) | ANY |
| MPLS LABEL (MPLS label) | ANY |
| MPLS TRAFFIC CLASS (MPLS traffic class) | ANY |
| IP SOURCE (IP src) | ANY |
| IP DESTINATION (IP dst) | ANY |
| IP PROTOCOL (IP protocol) | ANY |
| IP SERVICE TYPE (IP ToS bits) | ANY |
| SOURCE PORT (TCP/UDP src Port) | ANY |
| DESTINATION PORT (TCP/UDP dst Port) | ANY |

| ※PROPERTY ITEM | ※CHARACTERISTIC VALUE |
|---|---|
| COMMAND (Command) | Delete Flow entry |
| PRIORITY (Entry Priority) | 0xffff |
| IDLE TIME (Idle time) | 0x0003 |
| FIXATION TIME (Hard time) | 0x0000 |
| FLAG (Flag) | Send Flow Removed Flag=on |
| ACTION (Action) | Send to in-port |

NETWORK SYSTEM AND METHOD OF MANAGING TOPOLOGY

TECHNICAL FIELD

The present invention is related to a network system, and especially to a method of managing a physical topology of switches of a network system.

BACKGROUND ART

<Explanation of CD Separation Type Network>

A CD (C: control plane/D: data plane) separation type network is proposed which controls a node apparatus (data plane) by an external control system (control plane), as one of control systems of the network system.

As an example of the CD separation type network, an open flow network is exemplified which uses an open flow (OpenFlow) technique which carries out a route control of the network by controlling switches by a controller. The detail of the open flow technique is described in Non-Patent Literature 1 (OpenFlow Switch Specification Version 1.1.0). Note that the open flow network is only an example.

<Explanation of Open Flow Network>

In the open flow network, an open flow controller (OFC: OpenFlow Controller) controls the conduct of an open flow switch (OFS: OpenFlow Switch) by operating a flow table of the switch. The controller and the switch are connected by a secure channel which is used to control the switch by the controller with an open flow message (OpenFlow Message) as a control message conformed to an open flow protocol.

Hereinafter, for the simplification of description, the open flow controller (OFC) is referred to as a "controller (OFC)" and an open flow switch (OFS) is referred to as a "switch (OFS)". Also, the network of the controller and the switches which are connected by the secure channels is called a "secure channel network".

The switches (OFSs) configure the open flow network and each of the switches (OFS) is an edge switch or a core switch under the control of the controller (OFC). A series of packets from the reception of a packet in the edge switch on an input side to the transmission of the packet in the edge switch on an output side is called a flow in the open flow network.

The packet may be read as a frame. A difference between the packet and the frame is only a difference of the unit of data (PDU: Protocol Data Unit) handled by the protocol. The packet is a PDU of "TCP/IP" (Transmission Control Protocol/Internet Protocol). On the other hand, the frame is a PDU of the "Ethernet" (registered trademark).

The flow table is a table in which a flow entry defining a predetermined operation (action) to be carried out to a packet (communication data) which satisfies a predetermined match condition (rule) is registered.

The rule of the flow entry is defined based on various combinations of all or part of a destination address (dst), a source address (src), a destination port, and a source port, which are contained in a header region of each protocol hierarchy of the packet, and is identifiable. Note that the addresses contain a MAC (Media Access Control) address and an IP (Internet Protocol) address. Also, in addition to the above data, data of an input port (Ingress Port) is usable for the rule of the flow entry. Also, as the rule of the flow entry, a normal expression and an expression using wildcard "*" of a part (or all) of a value of the header region of the packet showing a flow may be set.

The action of the flow entry shows one of operations such as "outputting to a specific port", "discarding", or "rewriting a header". For example, if identification data of the output port (output port number and so on) is shown in the action of the flow entry, the switch (OFS) outputs a packet corresponding to this to the port, and if no identification data of the output port is not shown, the packet is discarded. Or, if the header data is shown in the action of the flow entry, the switch (OFS) rewrites the header of the packet based on the header data.

The switch (OFS) executes the action of the flow entry to a packet group (a packet sequence) which complies with the rule of the flow entry.

Note that in the open flow network, the controller (OFC) holds a copy of the flow entry on the switch (OFS) side to grasp and manage the flow entry on the switch (OFS) side. For example, the controller (OFC) holds the same flow table as that of the switch (OFS).

<Present Situation of Topology Detection in Open Flow Network>

In the open flow network, the controller (OFC) uses topology discovery protocol such as LLDP (Link Layer Discovery Protocol) and OFDP (OpenFlow Discovery Protocol) to collect connection data between neighbor switches (OFSs). Note that OFDP is the topology detection protocol in the open flow network for the extended LLDP.

Also, the controller (OFC) detects the topology of the whole open flow network based on the collected connection data between the neighbor switches (OFSs). As an example of the topology of the whole open flow network, the connection data between switches (OFSs) and data of the port for the connection and so on are exemplified.

The controller (OFC) realizes communication in the open flow network by setting an appropriate flow entry to an interconnection port between switches (OFSs) and a connection port of each switch (OFS) and a communication terminal unit (host) based on the detected connection data of switches (OFSs).

Moreover, in order to detect a failure except for a link down between the interconnection ports during the operation, the controller (OFC) instructs each switch (OFS) to regularly transmit a topology discovery packet (TDP) in LLDP and OFDP.

Each switch (OFS) transmits a port status message (PSM) to the controller (OFC).

The controller (OFC) receives a notice of the port status message (PSM) transmitted from each switch (OFS). Thus, the controller can detect the failure of the link down in case of occurrence of the failure of the link down between the interconnection ports.

As above, the controller (OFC) holds and updates the detected open flow network topology.

<Procedure of Detection and Maintenance of Topology in Existing Open Flow Network>

Referring to FIG. 1, the procedure of the topology detection and maintenance in the existing open flow network will be described.

For simplification of the description, an example of the open flow network which is configured from one controller (OFC) and two switches (OFS) will be described.

The existing open flow network contains a controller (OFC) 10 and a switch (OFS) 20-1 and a switch (OFS) 20-2.

The controller (OFC) 10 is connected with the switch (OFS) 20-1 and the switch (OFS) 20-2 through a secure channel network 100. A control signal between the controller (OFC) and the switch (OFS) is transmitted through the secure channel network 100. One of the control signals is an open flow message.

The controller (OFC) 10 stores a topology discovery packet (TDP) 30-2 in a packet-out message (POM) 30-1 and transmits the packet-out message (POM) 30-1 to the switch (OFS) 20-1 through the secure channel network 100. Note that the packet-out message (POM) 30-1 is one of the open flow messages.

The switch (OFS) 20-1 is provided with a connection port 21-1, and the switch (OFS) 20-2 is provided with a connection port 21-2. The connection port 21-1 and the connection port 21-2 are connection ports between the switches (OFSs). The connection port 21-1 and the connection port 21-2 connect the switch (OFS) 20-1 and the switch (OFS) 20-2.

The switch (OFS) 20-1 acquires the topology discovery packet (TDP) 30-2 stored in the packet-out message (POM) 30-1 and transmits the topology discovery packet (TDP) 30-2 to the connection port 21-1.

The topology discovery packet (TDP) 30-2 reaches the connection port 21-2 of the switch (OFS) 20-2 from the connection port 21-1 of the switch (OFS) 20-1.

The switch (OFS) 20-2 stores the received topology discovery packet (TDP) 30-2 in a packet-in message (PIM) 30-3 and transmits the packet-in message (PIM) 30-3 to the controller (OFC) 10 through the secure channel network 100. Note that the packet-in message (PIM) 30-3 is one of the open flow messages.

A specific process will be described below.

<Initial Setting Processing>

First, an initial setting processing to be executed before the start of topology detection processing will be described.

The controller (OFC) 10 sets a flow entry for the topology discovery packet (TDP) to each switch (OFS).

The controller (OFC) 10 specifies a match value (MV) to which the topology discovery packet (TDP) 30-2 matches, in a match field (MF) of this flow entry. That is, the match value (MV) of the match field (MF) becomes a rule of the flow entry.

The controller (OFC) 10 specifies an action of "transmit a packet-in message (PIM) of a topology discovery packet (TDP) to the controller (OFC) 10" in an action field (AF) of this flow entry. That is, the action in the action field (AF) becomes the action of the flow entry.

Therefore, each switch (OFS) transmits the packet-in message (PIM) 30-3 of the topology discovery packet (TDP) 30-2 to the controller (OFC) 10 when the received topology discovery packet (TDP) 30-2 matches the above-mentioned flow entry.

At this time, each switch (OFS) stores the topology discovery packet (TDP) 30-2 in a data field (DF) of the packet-in message (PIM) 30-3.

Also, each switch (OFS) stores a "DPID" (Delivery Point Identifier) and a "Port" of this switch (OFS) in the packet-in message (PIM) 30-3.

The "DPID" is an identifier data of the switch (OFS).

In this case, the "DPID" of the switch (OFS) 20-1 is supposed to be "OFS1-DPID". Also, the "DPID" of the switch (OFS) 20-2 is supposed to be "OFS2-DPID".

The "Port" is identifier data of the connection port of the switch (OFS).

In this case, the "Port" of the connection port 21-1 of the switch (OFS) 20-1 is supposed to be "Port1". Also, the "Port" of the connection port 21-2 of the switch (OFS) 20-2 is supposed to be "Port2".

<Topology Detection Processing>

Next, the topology detection processing which is executed after the initial setting processing completes will be described.

After the initial setting processing completes, the controller (OFC) 10 transmits the packet-out message (POM) 30-1 of the topology discovery packet (TDP) 30-2 as the open flow message to the port linked with each switch (OFS), through the secure channel network.

At this time, the controller (OFC) 10 specifies the action of "transmit the topology discovery packet (TDP) from the port linked" in the action field (AF) of the packet-out message (POM) 30-1 to be transmitted.

Also, the controller (OFC) 10 specifies "DPID" and "Port" of the switch (OFS) as a destination of the packet-out message (POM) 30-1 and as a source of the topology discovery packet (TDP) 30-2 for the topology discovery packet (TDP) 30-2.

In an example of FIG. 1, the switch (OFS) 20-1 is the destination of the packet-out message (POM) 30-1 and a switch (OFS) is the source of the topology discovery packet (TDP) 30-2.

Therefore, the controller (OFC) 10 transmits the packet-out message (POM) 30-1 of the topology discovery packet (TDP) 30-2 to the switch (OFS) 20-1.

At this time, the controller (OFC) 10 stores the topology discovery packet (TDP) 30-2 in the data field (DF) of the packet-out message (POM) 30-1.

Also, the controller (OFC) 10 specifies that the phrase of "transmits the topology discovery packet (TDP) 30-2 from the connection port 21-1 of the switch (OFS) 20-1" as an action in the action field (AF) of the packet-out message (POM) 30-1.

Also, the controller (OFC) 10 stores "OFS1-DPID" and "Port1" in the topology discovery packet (TDP) 30-2 as "DPID" and "Port" of the switch (OFS) 20-1. "OFS1-DPID" is identifier data of the switch (OFS) 20-1. The switch (OFS) 20-1 is a switch (OFS) as the source of the topology discovery packet (TDP) 30-2. "Port1" is identifier data of the connection port 21-1. The connection port 21-1 is a transmission port of the topology discovery packet (TDP) 30-2.

The switch (OFS) 20-1 receives the above-mentioned packet-out message (POM) 30-1 from the controller (OFC) 10.

The switch (OFS) 20-1 acquires the topology discovery packet (TDP) 30-2 stored in the data field (DF) of the packet-out message (POM) 30-1.

The switch (OFS) 20-1 transmits the topology discovery packet (TDP) 30-2 from the connection port 21-1 based on the action specified in the action field (AF) of the packet-out message (POM) 30-1.

As shown in FIG. 1, the connection port 21-1 of the switch (OFS) 20-1 is connected with the connection port 21-2 of the switch (OFS) 20-2. Therefore, the topology discovery packet (TDP) 30-2 which has been transmitted from the port 21-1 of the switch (OFS) 20-1 reaches the connection port 21-2 of the switch (OFS) 20-2.

The switch (OFS) 20-2 receives the topology discovery packet (TDP) 30-2 by the connection port 21-2.

The switch (OFS) 20-2 transmits a packet-in message (PIM) 30-3 of the topology discovery packet (TDP) 30-2 to the controller (OFC) 10 when the received topology discovery packet (TDP) 30-2 matches the flow entry set in an initial setting process.

At this time, the switch (OFS) 20-2 stores "OFS2-DPID" and "Port2" in the packet-in message (PIM) 30-3 as "DPID" and "Port" of the switch (OFS) 20-2. "OFS2-DPID" is identifier data of the switch (OFS) 20-2. The switch (OFS) 20-2 is a switch (OFS) as a source of the packet-in message (PIM) 30-3. "Port2" is identifier data of the connection port 21-2. The connection port 21-2 is a reception port of the topology discovery packet (TDP) 30-2.

Also, the switch (OFS) 20-2 stores the topology discovery packet (TDP) 30-2 in the data field (DF) of the packet-in message (PIM) 30-3.

The controller (OFC) 10 receives the above-mentioned packet-in message (PIM) 30-3.

The controller (OFC) 10 acquires "OFS2-DPID" and "Port2" of the switch (OFS) 20-2 as the source stored in this packet-in message (PIM) 30-3.

Also, the controller (OFC) 10 acquires the topology discovery packet (TDP) 30-2 stored in the data field (DF) of this packet-in message (PIM) 30-3, and acquires "OFS1-DPID" and "Port1" of the switch (OFS) 20-1 stored in the topology discovery packet (TDP) 30-2.

Thus, the controller (OFC) 10 detects that the connection port 21-1 of the switch (OFS) 20-1 has been connected with the connection port 21-2 of the switch (OFS) 20-2.

Also, the controller (OFC) 10 detects that the connection port 21-2 of the switch (OFS) 20-2 has been connected with the connection port 21-1 of the switch (OFS) 20-1 by flowing the topology discovery packet (TDP) 30-2 in a reverse direction in a mechanism similar to the above mechanism.

Moreover, the controller (OFC) 10 uses the above-mentioned topology discovery packet (TDP) 30-2 and the above-mentioned mechanism at a constant interval/number of times of retry during the operation, to maintain and update the detected topology.

Note that the specification of the DPID, the packet-in message (PIM) 30-3, the packet-out message (POM) 30-1, and the flow entry is prescribed in Non-Patent Literature 1 (OpenFlow Switch Specification Version 1.1.0).

<Problems in Maintenance and Updating of Detected Topology>

The procedure of the detection and maintenance of the topology in the above-mentioned existing open flow network is useful for initial detection of the topology in the open flow network but there are the following problems (1)-(3) in case of the maintenance and updating of the detected topology.

(1) The load to the secure channel network increases.

The controller (OFC) needs to transmit a topology discovery packet (TDP) onto the secure channel network regularly to the ports linked all the links of each switch (OFS) to maintain and update the detected topology.

Also, each switch (OFS) needs to transmit the received topology discovery packet (TDP) to the controller (OFC) through the secure channel network.

To maintain and update one bidirectional connection relation, four topology discovery packets (TDP) flow on the secure channel network to once topology scan.

(2) Because the controller (OFC) scan method is used to maintain and update the detected topology, it takes time to detect the change when there is a topology change.

The timing when detecting the topology change depends on an interval time during which the controller (OFC) outputs the topology discovery packet (TDP) during the operation and a reply timeout of the topology discovery packet (TDP) from the switch (OFS).

Although it is possible to detect the topology change more quickly if the interval time and the reply timeout are shorter, the load to the switches (OFSs) on the secure channel network increases, so that a risk increases that a not-occurring topology change is erroneously detected.

(3) Many existing switches (OFS) are realized by implementing the firmware corresponding to the open flow technique in conventional legacy switches.

For example, the switch (OFS) is realized in software by using a general-purpose processor of the conventional legacy switch to a processing part except for the processing part of "searching a flow entry to which a packet matches and processing the packet according to an action specified in the matched flow entry" in the processing of the open flow message.

Because the resource of the general-purpose processor is very limited, there is a great possibility that the processing of the open flow message is delayed or the open flow message itself is lost due to a lack of the resource for calculation, if the load (read load) of the open flow message to be processed increases.

For this reason, in the open flow network using such a switch (OFS), there is a great possibility that the controller (OFC) erroneously detects a not-occurring topology change so that the system falls down into a non-communicable state, if the topology detection and maintenance in the above existing open flow network is used.

As a related technique, a routing bridge system is disclosed in Patent Literature 1 (JP 2003-143169A). In this routing bridge system, a transmission route of data is determined by using an address of a data link layer of a ring network, in which a plurality of nodes are connected in a ring through a plurality of connection nodes. Each node is provided with a node tree producing section which produces a spanning tree between the nodes on the ring to which it belongs. Each connection node is provided with a node tree producing section which produces a spanning tree between the nodes on the ring to which it belongs, and an inter-ring tree producing section which produces an inter-ring spanning tree between the rings which are regarded as a logical link.

Also, a method of determining a connection topology of a home network is disclosed in Patent Literature 2 (JP 2006-340361A). The method of determining the connection topology of the home network can determine the connection topology of the home network which includes a multiple hub and a plurality of nodes disposed around a switch. This method has a step of transmitting topology determination messages one by one in a random sequence by the plurality of nodes, determining all the connection topologies one by one based on the reception of the topology determination message, and generating and updating a list of local nodes for all the local nodes. The topology determination message contains two continuing packets. A first packet is a broadcast packet which has a previously set payload which distinguishes it from the topology determination packet. The second packet is a unicast packet which has a same content and a non-existing destination MAC address.

Also, a method of detecting a topology to detect a logic topology of the network is disclosed in Patent Literature 3 (JP 2008-172449A). In this related technique, a communication unit records transfer data in which a port number and a source MAC (Media Access Control) address correspond to. Each time TTL (time to live) is increased one by one from "1", a management unit transmits to the communication unit, a trace request which contains the TTL. Next, the communication unit returns a trace response containing the transfer data to the management unit in response to a trace request of TTL=1. Then, the management unit acquires the transfer data from the received trace response and derives a port topology in a unit topology of the network.

Also, a configuration and optimization of a radio mesh-type network are disclosed in Patent Literature 4 (JP 2009-111976A). In this related technique, a network design tool provides a conversation-type graphic interface for addition, removal and positioning of a node and an equipment in the radio network, and a menu which contains a plurality of conversational-type screens to specify a threshold values, a network topology selection, a route setting and other configuration parameters related to the generation and optimization of a communication route and a schedule in the radio mesh-type network. The network design tool automatically applies a set of optimization rules to a network model together with parameters inputted from the user and generates a network configuration data in a high efficiency.

CITATION LIST

[Patent Literature 1] JP 2003-143169A
[Patent Literature 2] JP 2006-340361A
[Patent Literature 3] JP 2008-172449A
[Patent Literature 4] JP 2009-111976A
[Non-Patent Literature 1] "OpenFlow Switch Specification, Version 1.1.0 Implemented", [online] Feb. 28, 2011, the Internet (URL: http://www.openflowswitch.org/documents/openflow-spec-v1.1.0pdf)

SUMMARY OF THE INVENTION

An object of the present invention is to provide a network system such as an open flow network in which a controller can carry out the maintenance and update of a physical topology of switches in the state that a heavy delay has occurred in the network among the switches.

The network system according to the present invention contains a plurality of switches, each of which executes processing of a reception packet according to a flow entry having a rule and an action defined to uniformly control packets as a flow, and a controller which sets the flow entry to each of the plurality of switches. The controller sets a circulation flow entry to be deleted when the circulation packet which is mutually transmitted and received among the plurality of switches gets not to arrive, to each of the plurality of switches. When receiving a notice indicating that the circulation flow entry has been deleted, from each switch, the controller detects a failure among the plurality of switches.

The controller according to the present invention includes a mechanism that sets a flow entry having a rule and an action defined to each of a plurality of switches to uniformly control packets as a flow, a mechanism that sets a circulation flow entry to be deleted when a circulation packet which is mutually transmitted and received among the plurality of switches gets not to arrive, to each of the plurality of switches, a mechanism that detects a failure among the plurality of switches when receiving a notice indicating that the circulation flow entry has been deleted, from each switch.

A topology managing method implemented by a computer, according to the present invention includes setting a flow entry having a rule and an action defined to uniformly control packets as a flow, to each of a plurality of switches as a controller, setting a circulation flow entry to be deleted when a circulation packet which is mutually transmitted and received among the plurality of switches gets not to arrive, to each of the plurality of switches, and detecting a failure among the plurality of switches when receiving a notice indicating that the circulation flow entry has deleted, from each switch.

A program according to the present invention is a program to make a computer which is used as the controller, execute the processing of the above-mentioned topology managing method. Note that the program according to the present invention can be stored in a storage and a recording medium.

Thus, a load of the switch on a secure channel network can be reduced when maintaining and updating the topology in the open flow network and so on.

BRIEF DESCRIPTION OF THE DRAWINGS

FIG. 3 is a diagram showing the specification of a topology keepAlive packet according to the present invention.

FIG. 4 is a diagram showing a packet-out message in the present invention.

FIG. 5 is a diagram showing the specification of a topology keepAlive flow entry according to the present invention.

FIG. 6 is a diagram showing the specification of a flow entry change message according to the present invention.

FIG. 7 is a diagram showing the specification of a flow entry deleted message according to the present invention.

DESCRIPTION OF EXEMPLARY EMBODIMENTS

The present invention targets a CD separation type network. In this case, an open flow network as one of the CD separation type networks will be described, using it as an example. However, actually, the present invention is not limited to the open flow network.

First Exemplary Embodiment

Referring to the attached drawings, a first exemplary embodiment of the present invention will be described below.

In the present exemplary embodiment, in order to maintain and update a detected topology, the "topology KeepAlive flow entry (TKAFE)" and the "topology keepAlive packet (TKAP)" are prescribed and used.

The topology KeepAlive packet (TKAP) is a circulation packet which is previously prescribed to maintain and update the detected topology and is a packet which matches the topology KeepAlive flow entry (TKAFE).

The "topology KeepAlive flow entry (TKAFE)" and the "topology KeepAlive packet (TKAP)" will be described later in detail.

(System Configuration)

Figure 1:
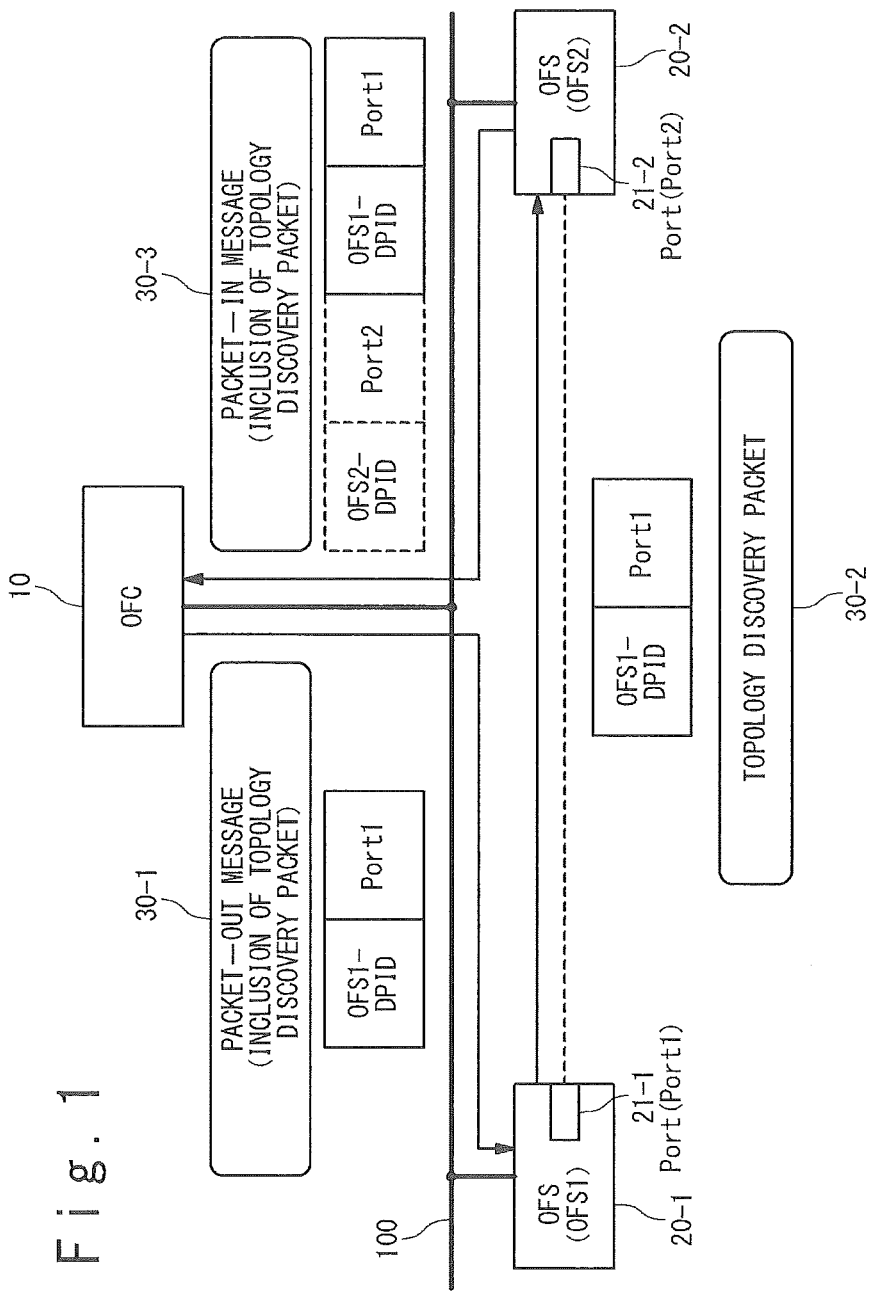
FIG. 1 is a diagram showing a procedure of the topology detection and maintenance in an existing open flow network.
Figure 2:
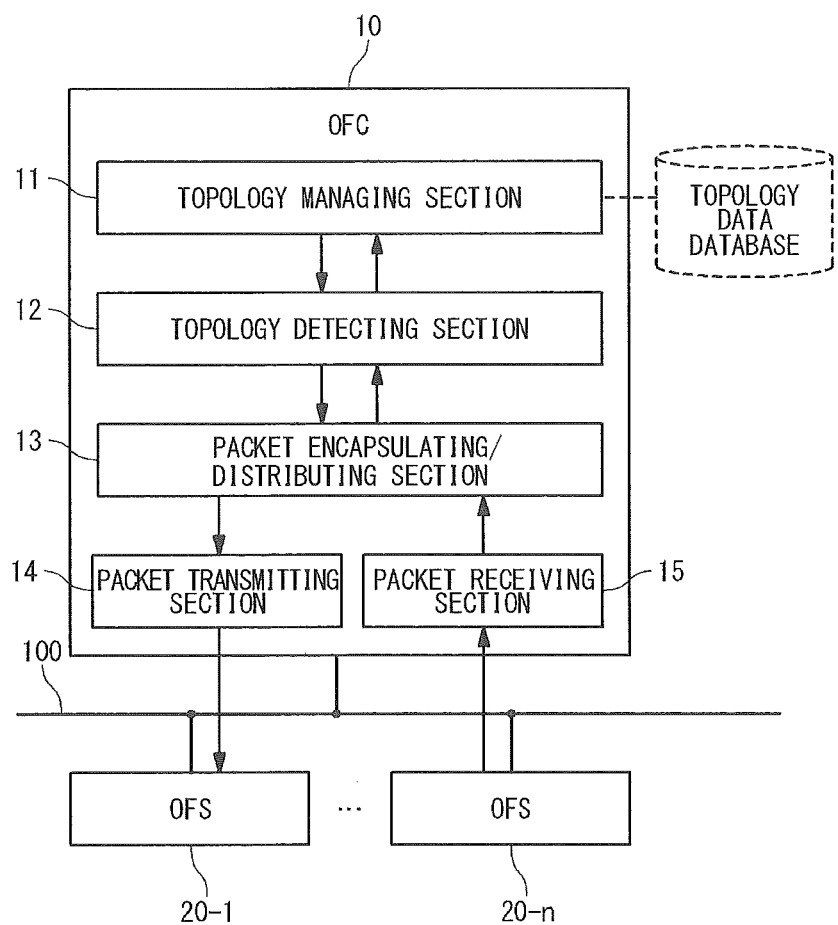
FIG. 2 is a diagram showing a structural example of a network system according to the present invention.

Referring to FIG. 2, a configuration example of the network system according to the present invention will be described.

The network system according to the present invention contains a controller (OFC) 10 and switches (OFSs) 20 (20-$i$, i=1 to n: n is an optional integer).

The controller (OFC) 10 sets a flow entry to each of the switches (OFSs) 20 (20-i, i=1 to n) (hereinafter, to be referred to as each switch (OFS) 20).

The controller (OFC) 10 is connected with each switch (OFS) 20 through a secure channel network 100. A control signal between the controller (OFC) and the switch (OFS) is transmitted through the secure channel network 100.

When receiving a packet, each switch (OFS) 20 compares the flow entry set from the controller (OFC) 10 and the received packet. When the value of a header field (HF) of the received packet matches a match value (MV) of a match field (MF) of the flow entry, the switch (OFS) 20 executes an action specified in the action field (AF) of the flow entry.

(Configuration of Controller (OFC))

Next, a configuration example of the controller (OFC) 10 will be described.

The controller (OFC) 10 has a topology managing section 11, a topology detecting section 12, a packet encapsulating/distributing section 13, a packet transmitting section 14 and a packet receiving section 15.

The topology managing section 11 manages a topology data database and preserves the topology data of the open flow network detected by the controller (OFC) 10 in a topology data database. Also, when an instruction is issued from the topology detecting section 12 to update the topology data, the topology managing section 11 updates the topology data which has been preserved in the topology data database in response to the instruction.

The topology detecting section 12 has an existing topology detection function and carries out the detection, maintenance and updating of the topology. That is, the topology detecting section 12 can generates the topology discovery packet (TDP) as in convention and can detect, maintain and update the topology. Also, the topology detecting section 12 generates the topology KeepAlive flow entry (TKAFE) and the topology KeepAlive packet (TKAP) prescribed in the present exemplary embodiment in order to maintain and update the detected topology. The topology detecting section 12 transfers the generated data to the packet encapsulating/distributing section 13. Moreover, the topology detecting section 12 analyzes a topology change notice message received from the packet encapsulating/distributing section 13 and instructs the topology managing section 11 to update the topology data preserved in the topology data database.

The packet encapsulating/distributing section 13 encapsulates an actual packet by using the data received from the topology detecting section 12 to transfer to the packet transmitting section 14. For example, the packet encapsulating/distributing section 13 generates a "modify flow entry message (MFEM)" for adding (registering) the topology KeepAlive flow entry (TKAFE) to each switch (OFS) 20 and transfers the flow entry change message (MFEM) to the packet transmitting section 14. Or, the packet encapsulating/distributing section 13 stores the topology KeepAlive packet (TKAP) received from the topology detecting section 12 in a packet-out message (POM), and transfers the packet-out message (POM) to the packet transmitting section 14. Also, the packet encapsulating/distributing section 13 analyzes the packet received from the packet receiving section 15 to distribute to an appropriate module. For example, the packet encapsulating/distributing section 13 analyzes the packet-in message (PIM) received from the packet receiving section 15 and acquires or generates the topology change notice message to transfer the topology change notice message to the topology detecting section 12.

The packet transmitting section 14 transmits the packet received from the packet encapsulating/distributing section 13 to each switch (OFS) 20 through the secure channel network 100. For example, the packet transmitting section 14 transmits the packet-out message (POM) to each switch (OFS) 20.

The packet receiving section 15 receives a packet from each switch (OFS) 20 through the secure channel network 100 and transfers the received packet to the packet encapsulating/distributing section 13. For example, the packet receiving section 15 receives the packet-in message (PIM) from each switch (OFS) 20 and transfers the packet-in message (PIM) to the packet encapsulating/distributing section 13.

(Specification of Topology KeepAlive Packet)

Referring to FIG. 3, the specification of the topology KeepAlive packet (TKAP) according to the present invention will be described.

As the topology KeepAlive packet (TKAP), an optional packet which meets the following conditions can be used.

(1) A packet of an optional type other than a packet type generally used, broadcasting (BC) and multicasting (MC).

(2) A packet in which a match field (MF) of the flow entry prescribed in Non-Patent Literature 1 (OpenFlow switch Specification Version 1.1.0) or a part thereof is defined.

In the present exemplary embodiment, a simple MAC header frame (Ether Header Frame) is used to make the overhead of the packet small. In FIG. 3, the description of the field other than the MAC header (Ether Header) field is omitted.

The topology detecting section 12 specifies the following value for each of a MAC source (Ether src) field, a MAC destination (Ether dst) field of the MAC header (Ether Header) field and a frame-type (Ether Type) field.

The topology detecting section 12 specifies "*" of wildcard for the MAC source (Ether src) field.

The topology detecting section 12 specifies a "MAC address other than broadcast (BC) and multicast (MC)" (Not BC/MC) for the MAC destination (Ether dst) field.

The topology detecting section 12 specifies "0x1111" of "Experimental Type" prescribed in IANA (Internet Assigned Number Authority) for the frame-type (Ether Type) field.

(Specification of Packet-Out Message)

Referring to FIG. 4, the specification of the packet-out message (POM) according to the present invention will be described.

The packet-out message (POM) has a header field (HF), an action field (AF) and a data field (DF).

The header field (HF) is a field used to store data indicating that this message is a packet-out message (POM).

The action field (AF) is a field used to specify a transmission port which sends out the packet stored in the data field (DF).

The data field (DF) is a field used to store the topology KeepAlive packet (TKAP).

In this case, the controller (OFC) 10 specifies "Type is Packet Out" in the header field (HF) of the packet-out message (POM). "Type is Packet Out" is data indicating that this message is a packet-out message (POM).

When receiving the packet-out message (POM), each switch (OFS) 20 sends out the topology KeepAlive packet (TKAP) stored in the data field (DF) of the packet-out message (POM) from the transmission port specified in the action field (AF).

(Specification of Topology KeepAlive Flow Entry)

Referring to FIG. 5, the specification of the topology KeepAlive flow entry (TKAFE) according to the present invention will be described.

The topology KeepAlive flow entry (TKAFE) has a match field (MF), a cookie field (CF) and an action field (AF).

(Match Field)

First, the match field (MF) will be described.

The match field (MF) is a field indicating an entry item which is used for matching of the packet. The entry item is a subfield of the match field (MF). The controller (OFC) 10 specifies a match value (MV) for every entry item shown in the match field (MF).

Note that in the entry item of the match field (MF) includes an input port (Ingress Port), meta data, a MAC source (Ether src), a MAC destination (Ether dst), a frame type (Ether type), a virtual LAN identifier (VLAN id), a virtual LAN priority (VLAN priority), a MPLS label (MPLS label), a MPLS traffic class (MPLS traffic class), an IP source (IP src), an IP destination (IP dst), an IP protocol, an IP service type (IP ToS bits), a source port (TCP/UDP src Port) and a destination port (TCP/UDP dst Port), and so on.

The input port (Ingress Port) shows a port which has first received this packet. The meta data shows data about this packet. The MAC source (Ether src), the MAC destination (Ether dst), and the frame type (Ether type) show a source MAC address, a destination MAC address, and 16-bit data to identify a protocol in an upper layer, respectively. The MPLS (Multi-Protocol Label switching) is a packet transfer technique using a label switching method. The MPLS label shows an identifying sign of a fixed length which is used instead of the IP header. The MPLS traffic class shows a different class or data to carry out specification and identification of a priority level. The IP source (IP src), the IP destination (IP dst), the IP protocol, and the IP service type (IP ToS bits) show a source IP address, a destination IP address, an IP protocol number, and a TOS octet (an octet part of 8 bits contained in the header of the IP packet), respectively. The TOS octet is used to specify a priority of processing for purpose to control the service quality (QoS) of communication. The source port (TCP/UDP src Port) and the destination port (TCP/UDP dst Port) show a source port number, and a destination port number, respectively.

In the present exemplary embodiment, only the input port (Ingress Port) and the frame type (Ether type) are used for the matching.

The controller (OFC) 10 specifies "ANY" as a match value (MV) of the entry item of the match field (MF) other than the input port (Ingress Port) and the frame type (Ether type) when setting the topology KeepAlive flow entry (TKAFE) to each switch (OFS) 20.

Because the entry item of the match field (MF) in which the match value (MV) is "ANY" matches an optional value (all values), it is not used for the matching of the packet.

Thus, each switch (OFS) 20 compares the received packet and the topology KeepAlive flow entry (TKAFE), and determines that the received packet and the topology KeepAlive flow entry (TKAFE) matches each other, when both of the values match each other with respect to the input port (Ingress Port) and the frame type (Ether type).

In this case, the controller (OFC) 10 specifies a specified port as the match value (MV) of the input port (Ingress Port). The specified port shows a port which is connected with another switch (OFS) 20, of the ports of switches (OFSs) 20 detected by the controller (OFC) 10.

Also, the controller (OFC) 10 specifies "0x1111" as the match value (MV) of the frame type (Ether type). "0x1111" shows a frame type (Ether type) of the topology KeepAlive packet (TKAP) in the present exemplary embodiment.

(Cookie Field)

Next, the cookie field (CF) will be described.

The cookie field (CF) is a field showing a cookie to temporarily save additional data and so on. A cookie value (CV) is specified in the cookie.

The controller (OFC) 10 specifies a 64-bit identifier as the cookie value (CV) of the cookie.

The identifier of 64 bits is an identifier to specify the flow entry internally managed by the controller (OFC) 10 which sets the topology KeepAlive flow entry (TKAFE). In the open flow technique, the controller (OFC) 10 holds a copy of the flow entry on the side of each switch (OFS) 20 to grasp and manage the flow entries on the side of the switch (OFS) 20.

(Action Field)

Next, the action field (AF) will be described.

The action field (AF) is a field indicating a property item (property) of the characteristic of the flow entry. The property item is a subfield of the action field (AF). The controller (OFC) 10 specifies a value (characteristic value) showing a characteristic for every property item shown in the action field (AF).

Note that there are a priority (Entry Priority), an idle time, a fixation time (Hard time), a flag, and an action and so on as the property items of the action field (AF).

The controller (OFC) 10 specifies "0xffff" for a priority level (Entry Priority). The priority level (Entry Priority) shows a priority level of a flow entry itself. "0xffff" shows the highest priority level. That is, the topology KeepAlive flow entry (TKAFE) becomes the flow entry having the highest priority level. Thus, each switch (OFS) 20 compares the topology KeepAlive flow entry (TKAFE) and the received packet with the highest priority, and when matching, executes the action of the topology KeepAlive flow entry (TKAFE).

Also, the controller (OFC) 10 specifies "0x0003" as the idle time and specifies "0x0000" as the fixation time (Hard time). In case of specification of the time, "0x0003" shows "3 seconds". Thus, when not receiving the following topology KeepAlive packet (TKAP) within 3 seconds after reception of the topology KeepAlive packet (TKAP), each switch (OFS) 20 determines that the topology KeepAlive flow entry (TKAFE) has been expired (termination of a term, invalidation), and deletes (ages out) the topology KeepAlive flow entry (TKAFE) from the flow table.

Also, the controller (OFC) 10 specifies "transmission flow deletion flag (SFRF: Send Flow Removed Flag)=on" as a flag. That is, it makes the transmission flow deletion flag (SFRF) "on" (effective). Thus, each switch (OFS) 20 deletes the expired topology KeepAlive flow entry (TKAFE) and then transmits an open flow message showing the deletion of the expired topology KeepAlive flow entry (TKAFE) to the controller (OFC) 10. In the present exemplary embodiment, each switch (OFS) 20 transmits a flow entry deleted message (FERM: Flow Entry Removed Message) to be described later after deleting the expired topology KeepAlive flow entry (TKAFE) to the controller (OFC) 10.

Also, the controller (OFC) 10 specifies an "operation of sending back a matched packet to the reception port" (Send to in-port) as the action. The "operation of sending back a matched packet to the reception port" shows the operation of sending back the packet to a connection port when the packet received from the connection port matches the flow entry. Thus, each switch (OFS) 20 sends back the topology KeepAlive packet (TKAP) matched with the topology KeepAlive flow entry (TKAFE) to the reception port. Therefore, the topology KeepAlive packet (TKAP) is mutually connected and circulates among the switches (OFS) 20 to which the topology KeepAlive flow entry (TKAFE) has been set.
(Specification of Flow Entry Change Message)

Referring to FIG. 6, the specification of the flow entry change message (MFEM) for the controller (OFC) 10 to add (register) the topology KeepAlive flow entry (TKAFE) to each switch (OFS) 20 will be described.

The flow entry change message (MFEM) has a header field (HF), a match field (MF), a cookie field (CF) and an action field (AF).

The header field (HF) is a field to store data showing that the message is the flow entry change message (MFEM).

In this case, the controller (OFC) 10 specifies "Type is Modify State" in the header field (HF) of the flow entry change message (MFEM). "Type is Modify State" is data showing that the message is the flow entry change message (MFEM).

The match field (MF), the cookie field (CF) and the action field (AF) are basically the same as those of the topology KeepAlive flow entry (TKAFE) described in FIG. 5.

Moreover, note that a command is added to the property item of the action field (AF).

The controller (OFC) 10 specifies "addition of a flow entry" (Add Flow entry) as a command when adding a new topology KeepAlive flow entry (TKAFE). Also, the controller (OFC) 10 specifies "change of a flow entry" (Modify Flow entry) as the command when correcting the existing topology KeepAlive flow entry (TKAFE).

Also, the controller (OFC) 10 specifies a set value to each item of the match field (MF), the cookie field (CF) and the action field (AF).

Each switch (OFS) 20 confirms the command in the action field (AF) when receiving the flow entry change message (MFEM).

When the content "change of a flow entry" (Modify Flow entry) is specified in the command of the action field (AF), each switch (OFS) 20 refers to each item of the match field (MF), the cookie field (CF) and the action field (AF) to confirm whether or not a corresponding topology KeepAlive flow entry (TKAFE) exists.

When the corresponding topology KeepAlive flow entry (TKAFE) does not exist, or when the "addition of a flow entry" (Add Flow entry) is specified in the command of the action field (AF), each switch (OFS) 20 adds a new topology KeepAlive flow entry (TKAFE) based on the value specified in each item of the match field (MF), the cookie field (CF) and the action field (AF) of the flow entry change message (MFEM).

When a corresponding topology KeepAlive flow entry (TKAFE) exists, each switch (OFS) 20 reflects the value specified in each item of the match field (MF), the cookie field (CF) and the action field (AF) of the flow entry change message (MFEM), onto the topology KeepAlive flow entry (TKAFE). That is, each switch (OFS) 20 overwrites the specified value in the corresponding field of the topology KeepAlive flow entry (TKAFE) in each field of flow entry change message (MFEM).

Thus, the controller (OFC) 10 can set the generated/corrected topology KeepAlive flow entry (TKAFE) on the side of each switch (OFS) 20.

Note that when the controller (OFC) 10 deletes the existing topology KeepAlive flow entry (TKAFE), it is sufficient to specify "deletion of a flow entry" (Delete Flow entry) as the command. The procedure of "Deletion of a flow entry" (Delete Flow entry) is the same as that of "change of a flow entry"
(Modify Flow Entry).
(Specification of Flow Entry Deleted Message)

Referring to FIG. 7, the specification of the flow entry deletion message (FERM) to be transmitted to the controller (OFC) 10 after deleting the expired topology KeepAlive flow entry (TKAFE) by each switch (OFS) 20 will be described.

The header field (HF) is a field to store data showing that the message is a flow entry deletion message (FERM).

In this case, each switch (OFS) 20 specifies "Type is Flow Removed" in the header field (HF) of flow entry deleted message (FERN). "Type is Flow Removed" is data showing that the message is a flow entry deletion message (FERM).

The match field (MF), the cookie field (CF) and the action field (AF) are basically the same as those of the flow entry change message (MFEM) described in FIG. 6.

Each switch (OFS) 20 specifies "deletion of a flow entry" (Delete Flow entry) in the command.

Also, each switch (OFS) 20 specifies a value (fixation value) which is specified in each time of the match field (MF), the cookie field (CF) and the action field (AF) to the topology KeepAlive flow entry (TKAFE) to be deleted.

The controller (OFC) 10 confirms at least one of the header field (HF) and the command in the action field (AF) when receiving the flow entry deletion message (FERN).

When "Type is Flow Removed" is specified in the header field (HF), or when "deletion of a flow entry" (Delete Flow entry) is specified as the command of the action field (AF), the controller (OFC) 10 refers to the 64-bit identifier stored in the cookie in cookie field (CF), or, refers to each item of the match field (MF), the cookie field (CF) and the action field (AF), and confirms whether or not the corresponding topology KeepAlive flow entry (TKAFE) exists.

The controller (OFC) 10 ignores and discards the flow entry deletion message (FERN) when the corresponding topology KeepAlive flow entry (TKAFE) does not exist.

The controller (OFC) 10 deletes the topology KeepAlive flow entry (TKAFE) when the corresponding topology KeepAlive flow entry (TKAFE) exists.

Thus, each switch (OFS) 20 can reflect the deletion of the expired topology KeepAlive flow entry (TKAFE) on the side of the controller (OFC) 10.

EXAMPLES

Figure 8:
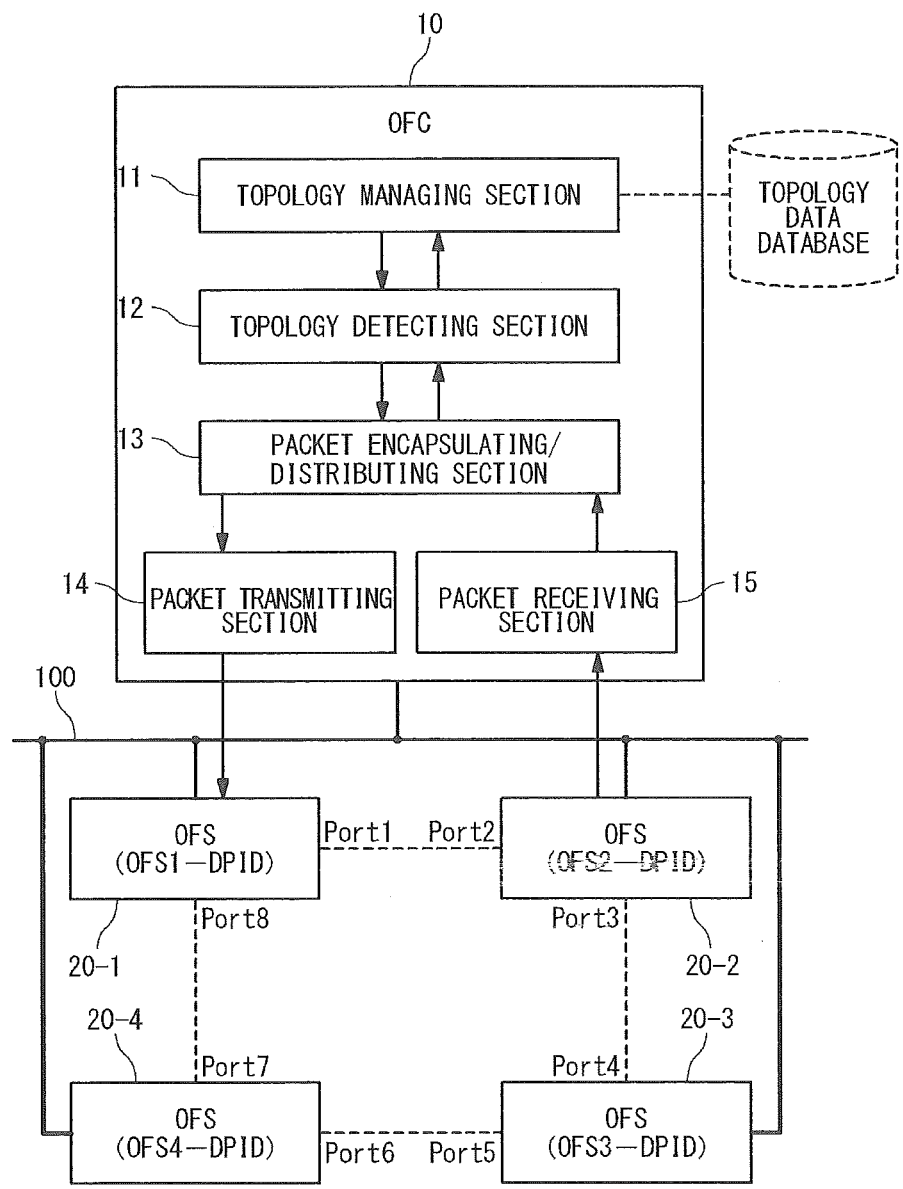
FIG. 8 is a diagram showing the network system according to an exemplary embodiment of the present invention.

Referring to FIG. 8, an example of the network system according to the present invention will be described.

In the present example, an open flow network has one controller (OFC) 10 and four switches (OFSs) 20.

The controller (OFC) 10 is connected with each of the four switches (OFS) 20 through the secure channel network 100. A control signal between the controller (OFC) and the switch (OFS) is transmitted through the secure channel network 100.

The four switches (OFSs) 20 are a switch (OFS) 20-1, a switch (OFS) 20-2, a switch (OFS) 20-3 and a switch (OFS) 20-4.

Here, "DPID" of the switch (OFS) 20-1 is supposed to be "OFS1-DPID". "DPID" of the switch (OFS) 20-2 is supposed to be "OFS2-DPID". "DPID" of the switch (OFS) 20-3 is supposed to be "OFS3-DPID". "DPID" of the switch (OFS) 20-4 is supposed to be "OFS4-DPID".

Also, "Port1" which is one of the connection ports of the switch (OFS) 20-1 is connected with "Port2" which is one of the connection ports of the switch (OFS) 20-2. "Port3"

which is one of the connection ports of the switch (OFS) 20-2 is connected with "Port4" which is one of the connection ports of the switch (OFS) 20-3. "Port5" which is one of the connection ports of the switch (OFS) 20-3 is connected with "Port6" which is one of the connection ports of the switch (OFS) 20-4. "Port7" which is one of the connection ports of the switch (OFS) 20-4 is connected with "Port8" which is one of the connection ports of the switch (OFS) 20-1.

(Topology Initial Detection)

First, the operation when the topology is initially detected will be described.

The topology detecting section 12 of the controller (OFC) 10 collects the interconnection relation data of the switches (OFSs) 20 by using the existing topology detection function and detects the topology of the open flow network.

The topology detecting section 12 stores the detected topology data in the topology data database of the topology managing section 11 as follows.
(Connection (OFS1-DPID: Port1 to OFS2-DPID: Port2), KeepAlive Flow Entry Cookie (0x0000000000000000))
(Connection (OFS2-DPID: Port2 to OFS1-DPID: Port1), KeepAlive Flow Entry Cookie (0x0000000000000000))
(Connection (OFS2-DPID: Port3 to OFS3-DPID: Port4), KeepAlive Flow Entry Cookie (0x0000000000000000))
(Connection (OFS3-DPID: Port4 to OFS2-DPID: Port3), KeepAlive Flow Entry Cookie (0x0000000000000000))
(Connection (OFS3-DPID: Port5 to OFS4-DPID: Port6), KeepAlive Flow Entry Cookie (0x0000000000000000))
(Connection (OFS4-DPID: Port6 to OFS3-DPID: Port5), KeepAlive Flow Entry Cookie (0x0000000000000000);
(Connection (OFS4-DPID: Port7 to OFS1-DPID: Port8), KeepAlive Flow Entry Cookie (0x0000000000000000))
(Connection (OFS1-DPID: Port8 to OFS4-DPID: Port7), KeepAlive Flow Entry Cookie (0x0000000000000000))

(Maintenance and Update of Topology)

Next, the operation when maintaining and updating the topology will be described.

The topology detecting section 12 sequentially takes out combinations of each switch (OFS) and port (Port) to have stored in the topology data database of the topology managing section 11 after detecting the topology in an initial stage, and generates the topology KeepAlive flow entry (TKAFE) based on the combination of the switch (OFS) and port (Port).

Also, the topology detecting section 12 generates a cookie to identify the topology KeepAlive flow entry (TKAFE) simultaneously with generation of the topology KeepAlive flow entry (TKAFE).

In the present example, the topology detecting section 12 first generates the topology KeepAlive flow entry (TKAFE) based on "Port1" of "OFS1-DPID".

The topology detecting section 12 specifies the following value to each entry item of the match field (MF) of the generated topology KeepAlive flow entry (TKAFE).

The topology detecting section 12 specifies "Port1" as the match value (MV) of the input port (Ingress Port).

The topology detecting section 12 specifies "0x1111" as the match value (MV) of the frame type (Ether Type).

The topology detecting section 12 specifies "0xffff" as a priority level (Entry Priority).

The topology detecting section 12 specifies "0x0003" as an idle time.

The topology detecting section 12 specifies "0x0000" as a fixation time (Hard time).

The topology detecting section 12 specifies "transmission flow deletion flag (SFRF)=on" in a flag. That is, the transmission flow deletion flag (SFRF) is made "on" (effective).

Also, the topology detecting section 12 generates the cookie simultaneously with the above-mentioned specification and specifies a 64-bit identifier to specify the flow entry to the cookie value (CV) of the cookie.

"0x0000000000000001" generated to identify the topology KeepAlive flow entry (TKAFE) of "Port1" of "OFS1-DPID" is specified as the cookie value (CV) of the cookie in the present example.

After generating the cookie, the topology detecting section 12 transfers data of the generated topology KeepAlive flow entry (TKAFE), the cookie value (CV), "DPID" of the destination switch (OFS) 20-1 and so on to the packet encapsulating/distributing section 13. The topology detecting section 12 issues an instruction to encapsulate the flow entry change message (MFEM) to add a new flow entry.

The packet encapsulating/distributing section 13 generates the flow entry change message (MFEM) described with reference to FIG. 6 based on the data and the instruction which are received from the topology detecting section 12. Also, the packet encapsulating/distributing section 13 transfers the IP address of the destination switch (OFS) of the generated flow entry change message (MFEM) and the port number of the secure channel port to the packet transmitting section 14.

The packet transmitting section 14 transmits the flow entry change message (MFEM) to the destination switch (OFS) from the secure channel port based on the data received from the packet encapsulating/distributing section 13.

In the present example, the packet transmitting section 14 transmits the flow entry change message (MFEM) to the switch (OFS) 20-1.

The topology detecting section 12 knows that the addition of the topology KeepAlive flow entry (TKAFE) to the switch (OFS) 20-1 is successful in a mechanism for the synchronization of "Barrier Request/Reply" which is prescribed in Non-Patent Literature 1 (OpenFlow switch Specification Version 1.1.0), and adds a cookie value (CV) of the topology KeepAlive flow entry (TKAFE) to have succeeded in the addition to the topology data database.

In the present example, the topology detecting section 12 adds the cookie value (CV) to the topology data database of the topology managing section 11 as follows.
(Connection (OFS1-DPID: Port1 to OFS2-DPID: Port2), KeepAlive Flow Entry Cookie (0x0000000000000001))

Also, at the present example, the topology detecting section 12 adds the topology KeepAlive flow entry (TKAFE) to "Port2" of "OFS2-DPID" which is interconnected to "Port1" of "OFS1-DPID" in the same way as the above procedure and sets the cookie value (CV) to the topology data database.

The topology detecting section 12 adds the following cookie value (CV) to the topology data database of the topology managing section 11.
(Connection (OFS2-DPID: Port2 to OFS1-DPID: Port1), KeepAlive Flow Entry Cookie (0x0000000000000002))

After the addition of the topology KeepAlive flow entry (TKAFE) to both of interconnected switches (OFSs) succeeds, the topology detecting section 12 transfers an instruction to transmit the topology KeepAlive packet (TKAP) and the packet-out message (POM) described with reference to FIG. 4 to both of the switches (OFSs), to the packet encapsulating/distributing section 13.

The packet encapsulating/distributing section 13 stores the topology KeepAlive packet (TKAP) in the data field (DF) of the packet-out message (POM) based on the data and the instruction received from the topology detecting section 12.

The operation is specified in which a packet in the data field (DF) is transmitted from the interconnection port between the switches (OFSs) to the action field (AF) of the packet-out message (POM).

In the present exemplary embodiment, the packet encapsulating/distributing section 13 generates the packet-out message (POM) which specifies the "operation to transmit a packet from Port1" in the action field (AF) to the switch (OFS) 20-1. Also, the packet encapsulating/distributing section 13 generates the packet-out message (POM) which specifies the "operation to transmit a packet from Port2" in the action field (AF) to the switch (OFS) 20-2.

The packet encapsulating/distributing section 13 transfers the packet-out messages (POM), the IP addresses of the destination switches (OFSs) and the port numbers of the secure channel ports to the packet transmitting section 14.

The packet transmitting section 14 transmits the packet-out messages (POM) to the destination switches (OFSs) based on the data received from the packet encapsulating/distributing section 13.

In the present example, the packet transmitting section 14 transmits the packet-out message (POM) which specifies the "operation to transmit a packet from Port1" in the action field (AF) to the switch (OFS) 20-1. Also, the packet transmitting section 14 transmits the packet-out message (POM) which specifies the "operation to transmit a packet from Port2" to the action field (AF) to the switch (OFS) 20-2.

The switch (OFS) 20-1 transmits the topology KeepAlive packet (TKAP) described with reference to FIG. 3 from the "Port1" according to the received packet-out message (POM).

The switch (OFS) 20-2 transmits the topology KeepAlive packet (TKAP) described with reference to FIG. 3 from the "Port2" according to the received packet-out message (POM).

Also, because the topology KeepAlive packet (TKAP) matches the topology KeepAlive flow entry (TKAFE) set to each of the switch (OFS) 20-1 and the switch (OFS) 20-2, the topology KeepAlive packet (TKAP) goes and returns between the "Port1" of the switch (OFS) 20-1 and the "Port2" of the switch (OFS) 20-2 unless the failure occurs.

In the above mechanism, the controller (OFC) 10 carries out the registration of the topology KeepAlive flow entry (TKAFE) and the transmission of the topology KeepAlive packet (TKAP) to a combination of all the detected switches (OFSs) and the ports.

(In Case of Failure Occurrence)

Next, the operation when a failure has occurred in the interconnection ports between the switches (OFSs) and the network will be described.

When the failure has occurred in the interconnection port between the switches (OFSs) and the network, the topology KeepAlive packet (TKAP) cannot arrive at the interconnection port between the switches (OFSs) correctly. That is, the packet which matches the topology KeepAlive flow entry (TKAFE) in the switch (OFS) gets not to arrive.

When the time period for which the packet which matches the topology KeepAlive flow entry (TKAFE) does not arrive becomes equal to or longer than a time period set to the idle time of the topology KeepAlive flow entry (TKAFE), the switch (OFS) determines that the topology KeepAlive flow entry (TKAFE) is expired and deletes the topology KeepAlive flow entry (TKAFE).

After deleting the expired topology KeepAlive flow entry (TKAFE), the switch (OFS) transmits the flow entry deletion message (FERM) described with reference to FIG. 7 to the controller (OFC) 10.

The topology detecting section 12 of the controller (OFC) 10 knows that the topology KeepAlive flow entry (TKAFE) of which port (Port) of which switch (OFS) has expired, by searching the topology data stored in the topology data database by using the cookie value (CV) of the flow entry deletion message (FERM) which has been transmitted from the switch (OFS), and deletes the topology data from the database.

In the present example, a case where a failure occurs between the "Port1" of the switch (OFS) 20-1 and the "Port2" of the switch (OFS) 20-2 (the interconnected ports) will be described as an example.

When the failure has occurred, the topology KeepAlive packet (TKAP) between the "Port1" of the switch (OFS) 20-1 and the "Port2" of the switch (OFS) 20-2 gets not to reach the switch (OFS) 20-1 and the switch (OFS) 20-2.

When 3 seconds passed after the topology KeepAlive packet (TKAP) which matches the topology KeepAlive flow entry (TKAFE) gets not to arrive, each of the switch (OFS) 20-1 and the switch (OFS) 20-2 determines that the topology KeepAlive flow entry (TKAFE) has expired and deletes the topology KeepAlive flow entry (TKAFE).

Each of the switch (OFS) 20-1 and the switch (OFS) 20-2 transmits the flow entry deletion message (FERM) to the controller (OFC) 10 after deleting the topology KeepAlive flow entry (TKAFE).

The controller (OFC) 10 receives the flow entry deletion message (FERM) from each of the switch (OFS) 20-1 and the switch (OFS) 20-2.

The controller (OFC) 10 determines based on the cookie value (CV) stored in the flow entry deleted message (FERM) that the interconnection gets to be not present, and updates a topology change by deleting interconnection data from the topology data database.

Note that the cookie value (CV) stored in the flow entry deleted message (FERM) which has been received from the switch (OFS) 20-1 is "0x0000000000000001".

Also, the cookie value (CV) stored in the flow entry deleted message (FERN) which has been received from the switch (OFS) 20-2 is "0x0000000000000002".

In the present example, the controller (OFC) 10 updates the topology change by deleting the following interconnection data from the topology data database.

(Connection (OFS1-DPID: Port1 to OFS2-DPID: Port2), KeepAlive Flow Entry Cookie (0x0000000000000001)).
(Connection (OFS2-DPID: Port2 to OFS1-DPID: Port1), KeepAlive Flow Entry Cookie (0x0000000000000002)).

Second Exemplary Embodiment

Below, the second exemplary embodiment of the present invention will be described.

In the present exemplary embodiment, when the topology KeepAlive flow entry (TKAFE) expired, the topology test is carried out for the number of times of retry by using the LLDP packet without determining that the failure has occurred in the interconnection port immediately.

That is, a double test is carried out and when the interconnection relation cannot be confirmed, it is determined that a failure has occurred in the interconnection ports between the switches (OFSs) in the topology test by using LLDP packet.

<Relation of Each Exemplary Embodiment>

Note that the above-mentioned exemplary embodiments can be implemented by combining them.

<Characteristic of the Present Invention>

Next, the characteristic of the present invention will be described.

For example, the network system according to the present invention relates to the open flow network in which the controller (OFC) carries out the maintenance and update of the physical topology of the switches in the situation that the network between the switches (OFSs) are under a great delay.

After the initial connection between the switches (OFSs) completes, the controller (OFC) set to the interconnection port of each switch (OFS), a circulation flow entry in which "the operation of transferring a packet to a port from the packet has entered" (Send to in-port) is specified in the action field (AF) and an idle time is specified in an idle timeout field. Note that the topology KeepAlive flow entry (TKAFE) is one of circulation flow entries.

The controller (OFC) sends a previously prescribed circulation packet to the interconnection port of each switch (OFS) by using the packet-out message (POM). Note that the topology KeepAlive packet (TKAP) is one of the circulation packets.

The circulation packet matches the circulation flow entry in which "Send to in-port" is specified in the action field (AF) and goes and returns among the interconnection ports of the switches (OFSs).

Upon occurrence of a failure at the interconnection port among OPS, the circulation packet gets not to arrive at the interconnection port of each switch (OFS).

The packet matching the circulation flow entry in which "Send to in-port" is specified in the action field (AF) extinguishes at each switch (OFS).

Each switch (OFS) deletes (Ages out) the circulation flow entry after the elapse of the idle time which is specified in the idle timeout field of the circulation flow entry.

Also, the switch (OFS) notifies an Ages out message indicating that the circulation flow entry is deleted (Aged out), to the controller (OFC).

The controller (OFC) determines that the failure has occurred in the interconnection port among the switches (OFSs) based on the Ages out message of the circulation flow entry notified from the switch (OFS).

Note that in the network system according to the present invention, a mechanism is used in which each switch (OFS) independently notifies a topology change to the controller (OFC) in the open flow network, without using a mechanism in which the controller (OFC) maintains a detected topology, and transmits a scanning packet frequently in order to detect the topology change. Therefore, the load to the switch (OFS) on the secure channel network can be reduced.

Also, in the network system according to the present invention, a mechanism using an idle time of the topology KeepAlive flow entry (TKAFE), an expiration and a flow entry deleted message (FERM) is employed. Therefore, it is possible to adjust to quickly detect the topology change without imposing a load to the switch (OFS) on the secure channel network.

Also, in the network system according to the present invention, a packet transmitted onto the secure channel to notify the topology change is only one to one interconnection port among the switches (OFSs). Therefore, in the secure channel in the state of high load, a possibility that the detection of the topology change is missed becomes lower than that of the existing topology detection technique.

Also, in the network system according to the present invention, the switch (OFS) processes the topology KeepAlive packet (TKAP) by use of an LSI other than a general-purpose processor. Therefore, a possibility that a not-occurring change of a physical topology is erroneously detected due to a lack of resources of the general-purpose processor of the switch (OFS) can be reduced.

Moreover, in the network system according to the present invention, if a switch (OFS) conforming to the open flow protocol (OpenFlow Protocol) is used, it is not necessary to add a new function (hardware function, software function) to the switch (OFS) and the detection of the topology change can be realized only by addition the software function to the controller.

<Exemplification of Hardware>

An example of specific hardware configuration to realize the network system according to the present invention will be described below.

As an example of the controller (OFC), computers such as a PC (personal computer), an appliance, a thin client server, a workstation, a mainframe, a supercomputer are supposed. Note that the controller (OFC) may be a relay unit and a peripheral unit in addition to a terminal and a server. Also, the controller (OFC) may be an extension board mounted on a computer and a virtual machine (VM) built on a physical machine.

As an example of the switch (OFS), a network switch, a router, a proxy, a gateway, a firewall, a load balancer (load distribution unit), a band control system (packet shaper), a security monitoring and controlling equipment (SCADA: Supervisory Control And Data Acquisition), a gatekeeper, a base station, an access point (AP), a communication satellite (CS) or a computer which has a plurality of communication ports and so on are exemplified. Also, it may be a virtual switch which is realized by a virtual machine (VM) built on the physical machine.

Each of the controller (OFC) and the switch (OFS) may be installed in moving vehicles such as a car, a ship, and an aircraft.

Each of the controller (OFC) and the switch (OFS) is realized by a processor driven based on a program and executing processing, a memory storing the program and data of various kinds, and an interface used for communication with the network, although being not shown.

As an example of the above-mentioned processor, a CPU (Central Processing Unit), a network processor (NP), a microprocessor, a microcontroller, a semiconductor integrated circuit (LSI: Large Scale Integration) which has an exclusive use function are exemplified.

As an example of the memories, a semiconductor memory device such as a RAM (Random Access Memory), a ROM (Read Only Memory), an EEPROM (Electrically Erasable and Programmable Read Only memory) and a flash memory, an auxiliary storage such as an HDD (Hard Disk Drive) and an SSD (Solid State Drive), a removable disk such as a DVD (Digital Versatile Disk) and a recording medium such as a SD memory card (Secure Digital Memory Card) and so on are exemplified. Also, the memory may be a buffer and a register and so on. Or, the memory may be a storage unit using a DAS (Direct Attached Storage), a FC-SAN (Fibre Channel-Storage Area Network), a NAS (Network Attached Storage), an IP-SAN (IP-Storage Area Network).

Note that above-mentioned processor and above-mentioned memory may be unified. For example, in recent years, one chip microcomputer and so on is moving ahead. Therefore, the case that the 1 chip microcomputer which is loaded into the electronic equipment and so on has above-mentioned processor and above-mentioned memory, too, can be thought of.

As an example of the above-mentioned interface and so on, a substrate (a motherboard, an I/O board) corresponding to a network communication, a semiconductor integrated circuit such as a chip, a network adapter such as NIC (Network Interface Card), and communication ports such as a similar expansion card, the communication devices such as an antenna, a connection mouth (a connector) and so on are exemplified.

Also, as an example of the network, the Internet, a LAN (Local Area Network), a wireless LAN (Wireless LAN), a WAN (Wide Area Network), a backbone, a CATV line, a fixation telephone network, a mobile phone network, a WiMAX (IEEE 802.16a), a 3G unit (3rd Generation), a dedicated line (lease line), IrDA (Infrared Data Association), Bluetooth (registered trademark), a serial communication line, a data bus and so on are exemplified Note that the components of the controller (OFC) may be modules, components, exclusive use devices and these start-up (call) programs.

However, the present invention is actually not limited to these examples.

<Remarks>

As above, the exemplary embodiments of the present invention have been described, but actually, the present is not limited to the above-mentioned exemplary embodiments and various modifications which do not deviate from the scope of the present invention are within the present invention.

Note that this application claims a priority on convention based on Japan Patent Application No. JP 2012-016225 and the disclosure thereof is incorporated herein by reference.

The invention claimed is:

1. A network system comprising:
   a plurality of switches, each of which is configured to carry out processing of a received packet based on a flow entry in which a rule and an action are defined to uniformly control packets as a flow; and
   a controller configured to set to each of said plurality of switches, a circulation flow entry to be deleted when a circulation packet which is mutually transmitted and received among said plurality of switches gets not to arrive, and detect a failure among said plurality of switches, when receiving a notice indicating that the circulation flow entry has been deleted from each of said plurality of switches,
   wherein said controller is configured to:
       set to said switch by specifying an action of transferring a packet to a port from which the packet has entered, and an idle time indicating an effective period from when a matching packet gets not to arrive, to a circulation flow entry;
       generate the circulation packet to transmit to each of said plurality of switches; and
       receive a notice indicating that the circulation flow entry has been deleted after the idle time passed, from said each switch.

2. The network system according to claim 1, wherein said controller is configured to:
   carry out a topology test a predetermined number of times of retry by using a Link Layer Discovery Protocol (LLDP) packet when receiving a notice indicating that the circulation flow entry has been deleted after the idle, time passed; and
   determine that a failure has occurred among said plurality of switches when an interconnection relation cannot be confirmed in the topology test using the LLDP packet.

3. A controller comprising:
   means for setting to each of a plurality of switches, a flow entry having a rule and an action defined to uniformly control packets as a flow;
   means for setting to each of said plurality of switches, a flow entry for a circulation flow entry to be deleted when a circulation packet which is mutually transmitted and received between said plurality of switches gets not to arrive;
   means for detecting the failure between said plurality of switches when receiving the notice indicating that the circulation flow entry has been deleted;
   means for setting to each of said plurality of switches, by specifying that the action indicating a transfer of a packet to a port from which the packet has entered, and an idle time indicating an effective period from a time when the matching packet gets not to arrive;
   means for generating the circulation packet to transmit to each of said plurality of switches; and
   means for receiving a notice indicating that the circulation flow entry whose idle time passed has been deleted, from each of said plurality of switches.

4. The controller according to claim 3, further comprising:
   means for carrying out a topology test a predetermined number of times of retry by using a Link Layer Discovery Protocol (LLDP) packet when receiving the notice indicating that the circulation flow entry whose idle time has passed has been deleted; and
   means for determining that a failure has occurred among said plurality of switches when an interconnection relation cannot be confirmed in the topology test using the LLDP packet.

5. A topology managing method implemented by a computer, comprising:
   setting, by a controller, a flow entry having a rule and an action defined to uniformly control packets as a flow, to each of the plurality of switches;
   setting to each of said plurality of switches, a circulation flow entry to be deleted when the circulation packet which is mutually transmitted and received among said plurality of switches, gets not to arrive;
   detecting a failure among said plurality of switches when receiving a notice indicating that the circulation flow entry has been deleted, from each of said plurality of switches;
   setting to each of said plurality of switches, by specifying an action that a packet is transferred to a port from which the packet has entered, and an idle time indicating an effective period from a time when a matching packet gets not to arrive, to the circulation flow entry;
   generating a circulation packet to transmit to each of said plurality of switches; and
   receiving a notice indicating that the circulation flow entry whose idle time passed has been deleted, from each of said plurality of switches.

6. The topology managing method according to claim 5, further comprising:
   carrying out a topology test a predetermined number of times of retry by using a Link Layer Discovery Protocol (LLDP) packet when receiving a notice indicating that the circulation flow entry whose idle time passed has been deleted; and determining that a failure has occurred among said plurality of switches when an interconnection relation cannot be confirmed in the topology test using the LLDP packet.

7. A non-transitory computer-readable recording medium which stores a computer-executable program to make a computer execute a process of:

setting as a controller, a flow entry having a rule and an action defined to uniformly control a packet as a flow to each of a plurality of switches;

setting a circulation flow entry to be deleted when a circulation packet which is mutually transmitted and received among said plurality of switches gets not to arrive, to each of said plurality of the switches;

detecting a failure among said plurality of switches when receiving a notice indicating that a circulation flow entry has been deleted, from each of said plurality of switches;

setting to each of said plurality of switches by specifying an action of transferring a packet to a port from which the packet has entered, and an idle time indicating an effective period from a time when a matching packet gets not to arrive, to the circulation flow entry;

generating the circulation packet to transmit to each of said plurality of switches; and receiving the notice indicating that the circulation flow entry whose idle time passed has been deleted, from each of said plurality of switches.

8. The recording medium according to claim 7, wherein the process further comprises:

carrying out a topology test a predetermined number of times of retry by using a Link Layer Discovery Protocol (LLDP) packet when receiving the notice indicating that the circulation flow entry whose idle time has passed is deleted; and determining that a failure has occurred among said plurality of switches when an interconnection relation cannot be confirmed in the topology test using the LLDP packet.

* * * * *